(12) United States Patent
Karabaic

(10) Patent No.: US 6,595,778 B1
(45) Date of Patent: Jul. 22, 2003

(54) BASE TEN PRIMARY TEACHING KIT

(76) Inventor: James M. Karabaic, 1632 Waterston Ave. #104, Austin, TX (US) 78703

( * ) Notice: Subject to any disclaimer, the term of this patent is extended or adjusted under 35 U.S.C. 154(b) by 0 days.

(21) Appl. No.: 10/061,484

(22) Filed: Feb. 4, 2002

(51) Int. Cl.[7] ................................................ G09B 19/02
(52) U.S. Cl. ...................... 434/189; 434/191; 434/195; 434/188; 434/207; 434/209
(58) Field of Search ................. 434/189, 195, 434/199, 204, 188, 191, 205

(56) References Cited

U.S. PATENT DOCUMENTS

| | | | | |
|---|---|---|---|---|
| 1,471,437 A | * | 10/1923 | Wood | 434/195 |
| 2,494,469 A | * | 1/1950 | Booth | 273/299 |
| 2,835,988 A | * | 5/1958 | Hilkene | 434/195 |
| 3,229,388 A | * | 1/1966 | Smith | 434/195 |
| 5,297,965 A | * | 3/1994 | Manancero | 434/195 |
| 5,769,639 A | * | 6/1998 | Foster | 434/159 |
| 5,927,718 A | * | 7/1999 | Heaton | 273/272 |

* cited by examiner

Primary Examiner—Derris H. Banks
Assistant Examiner—Dmitry Suhol
(74) Attorney, Agent, or Firm—Joseph F. Long

(57) ABSTRACT

A kit containing an Instructor unit sized for presentation to a group and multiple Child training units both set up to allow students to visually model and relate addition, subtraction, multiplication, and division in prinmry mathematics.

3 Claims, 3 Drawing Sheets

BASE TEN PRIMARY TEACHING KIT

BACKGROUND OF THE INVENTION

It is well known that many primary students have difficulty in learning primary mathematics in our base ten system. Students also now need to become familiar with and learn to use a base two system but this is normally reserved for higher grades. This invention provides a model for the Instructor to use and a somewhat similar model for the child to use either personally or in very small groups.

The kit includes an Instructor unit that basically is one inch cubes, with five blue cubes, five red cubes and five yellow cubes with cubes held in a vertically aligned slots with each slot being about three inches wide so that all cubes may be hidden under a numbered center line stick. An example of use is as follows: three cubes may be pushed out with a 3 inch angle stick to show we now have three; four more may be pushed out with a 4 inch angle stick to show that we have ADDED 4 so that we now have 7. Two may be pushed below the center line stick to show that we SUBTRACTED 2 so that we now have 5. In the Instructor unit the sticks are angles and may be removably marked to show fractions and percentages. Students can visually see that ¼ equals 25% etc,etc Also included in the Kit are Child training units using three eighths inch cubes held vertically in slots and may be manually slid back and forth to indicate addition, subtraction, division and multiplication. The slots are approximately ¼ inch deep. Thus a child can both DO and SEE simple mathematical calculations. Actual classroom use has proven the worth of these units. Paper model copies of the training unit are also used so that a child may color in instructor suggested problems.

We can stack angle sticks that are used to aid the visualization of addition, subtraction, multiplication and division next to the right side of the cubes in the Instructor unit. These angle sticks can be chosen to be the proper length for a fraction or percentage of a chosen number and removably labeled. The unit then also allows teaching and visualization of the use of fractions and percentages and their interrelationships.

We have found no training models in the literature allowing the same utility and visualization.

SUMMARY OF THE INVENTION

The kit may be summarized as containing a vertical cube stack with different sized angled sticks to allow a teacher to move cubes to indicate simple mathematical functions and their interrelations with the cubes allowing a student to actually visualize each operation. There is also available a Child training unit that allows the child to both do and see simple operations.

DESCRIPTION OF THE INVENTION

Figure 1:
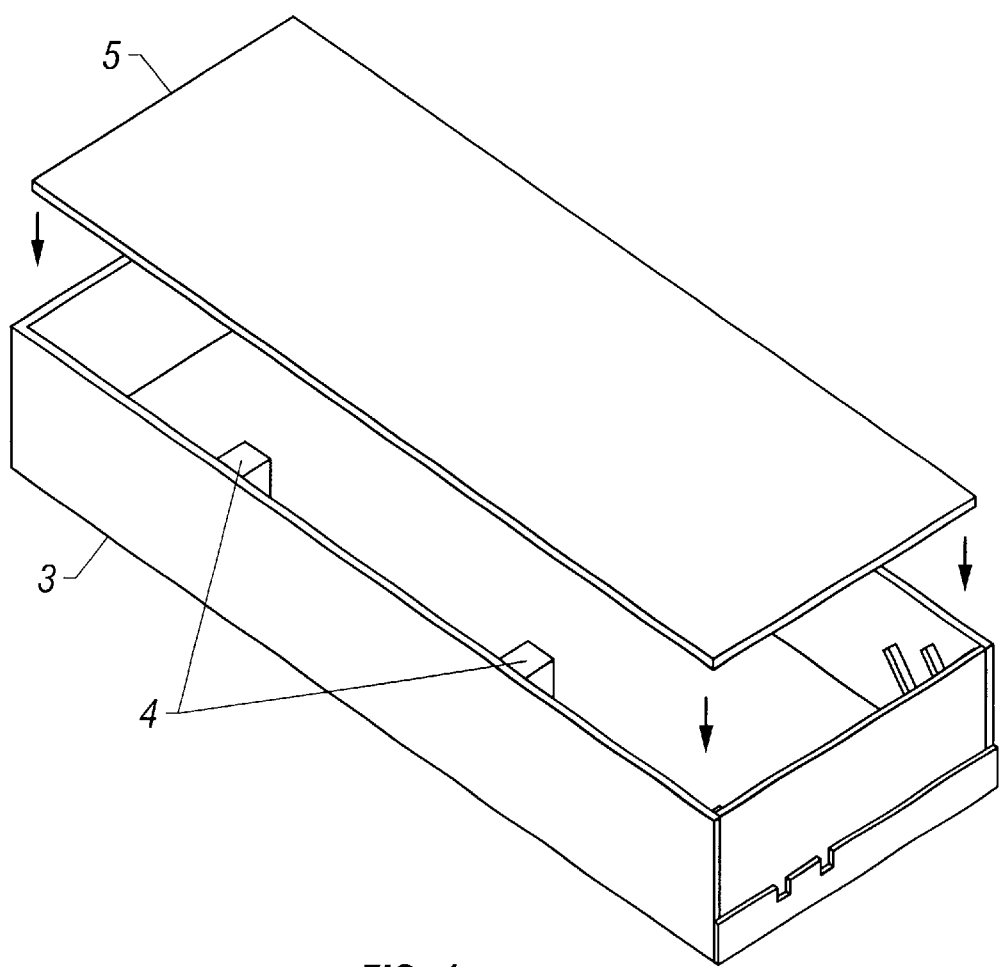
FIG. 1 shows a three dimensional view of the container for both the instructor unit and child training units.

The invention may best be described from the drawings. In FIG. 1 we see the container 3 with the upper side of a flat closure 5 that fits closely into the container 3 and is supported by posts 4 on internal sides of container 3. The instructor unit is attached to the underside of top 5 as shown in detail in FIG. 2.

Figure 2:
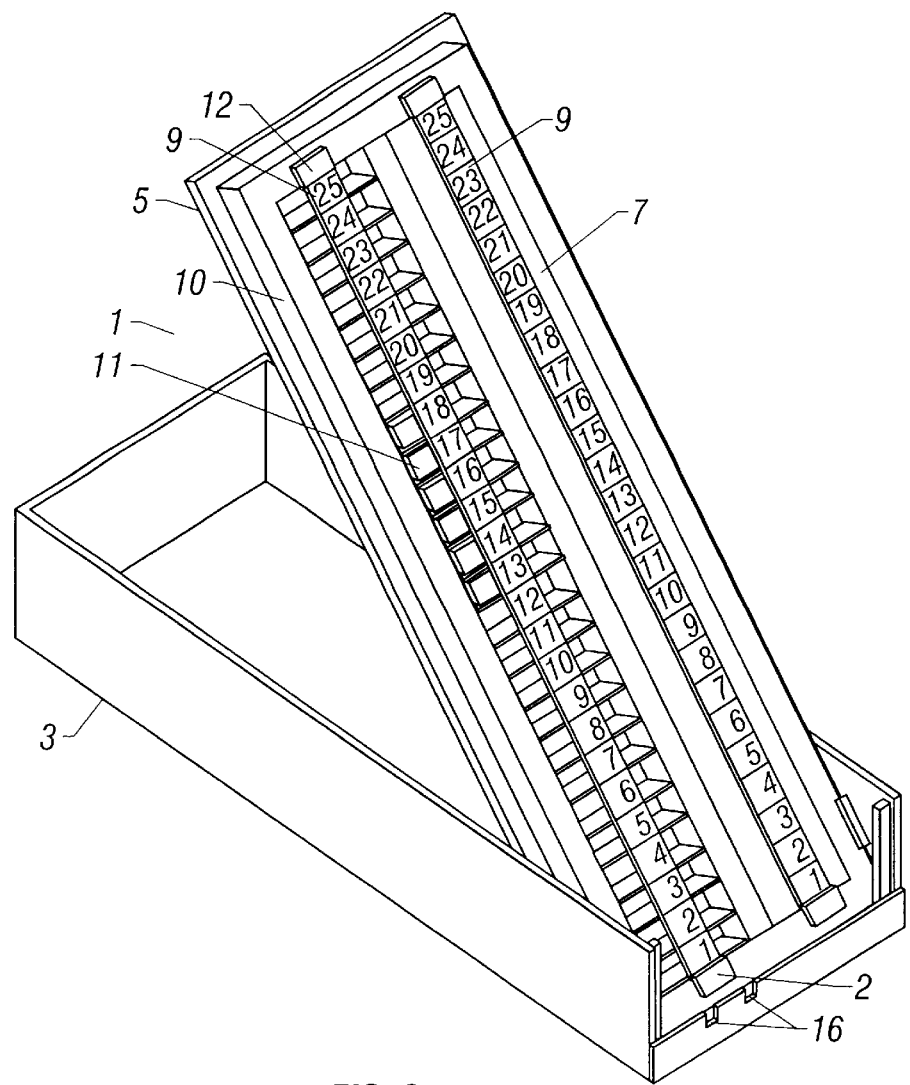
FIG. 2 show a three dimensional view of the instructor teaching unit.

In FIG. 2 we see kit 1, box or container 3, and there is an angled slot on each interior side of the box (not shown) for sliding top 5 into a semi-vertical position. Teaching tray 7 is held on the underside of top 5. Number line stick 9 covers colored one inch cubes 11 in groups of five. Number 9 indicates one of several number line sticks that is removably held in place with holding units called holders 2 and 12. Holder 12 is an open one inch by one inch rectangular structure and holder 2 is a one inch by one inch cuplike structure both of which may be glued to teaching tray 7.

Figure 4:
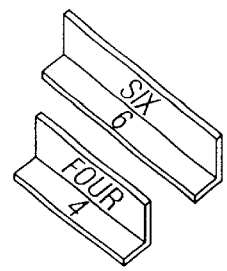
FIG. 4 shows two of a group of angle sticks sized from one to ten blocks in length.

We have shown teaching tray 7 held in a useable position by sliding back 5 in box 3. Number bridge 10 tray is held in place and we have chosen to show twenty five slots each about three inches in diameter and about ½ inch deep so that one inch cubes 11 may be slid to the center and hidden under number line stick 9 which is removably held in place by holders 12 and 2. Other numbers of slots could be used equally well. There are groups of five blue cubes in one group, five red cubes in a second group and five yellow cubes held in number bridge 10. Side 7 will hold a group of number line sticks and a group of angle sticks that are formed with angle sticks being one to ten cubes in length. Angle sticks are shown in FIG. 4. Although there will be two angle sticks of each length from 1 inch to 10 inches, for clarity only two are shown. Each angle stick is labeled on the interior side with the length in inches in word form on one side and in number form on the other side. These angle sticks are plastic and the instructor may label on the exterior sides to indicate fractions or percentages or numbers. For example when working with a total number of twelve a 4 inch angle stick could be labeled one third and the instructor could show that it takes three 4 inch angle sticks to equal the twelve. He could also show that one 4 inch angle stick equals 33⅓% and explain WHY! These labels may be put on with erasable marker to be easily removable. It might be shown when working with a total of eight numbers that this 4 inch angle stick then becomes ½ as a fraction or 50% as a percentage.

This aids in student learning through allowing easy linear and vertical visualization for the student.

Figure 3:
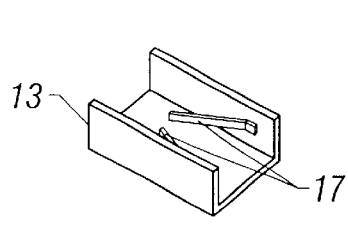
FIG. 3 shows a sweeper unit to hide blocks under a Number—line—stick.

FIG. 3 shows a sweeper unit 13 that may be placed upon and slid down the number bridge 10 to use flexible arms 17 to "sweep" or slide all blocks to be hidden in 3 inch wide slots as described under FIG. 2 under a number line stick 9. Slots 16 in the front portion of box 3 allow the sweeper unit 13 to exit to complete the movement of all the blocks.

FIG. 4 shows two angle sticks and there will be two groups of angle sticks from 1 to 10 inches in length with each group having some of the angle sticks stacked next to the right side of the cube slots in the Instructor unit and the remainder loosely held in container 3.

Figure 5:
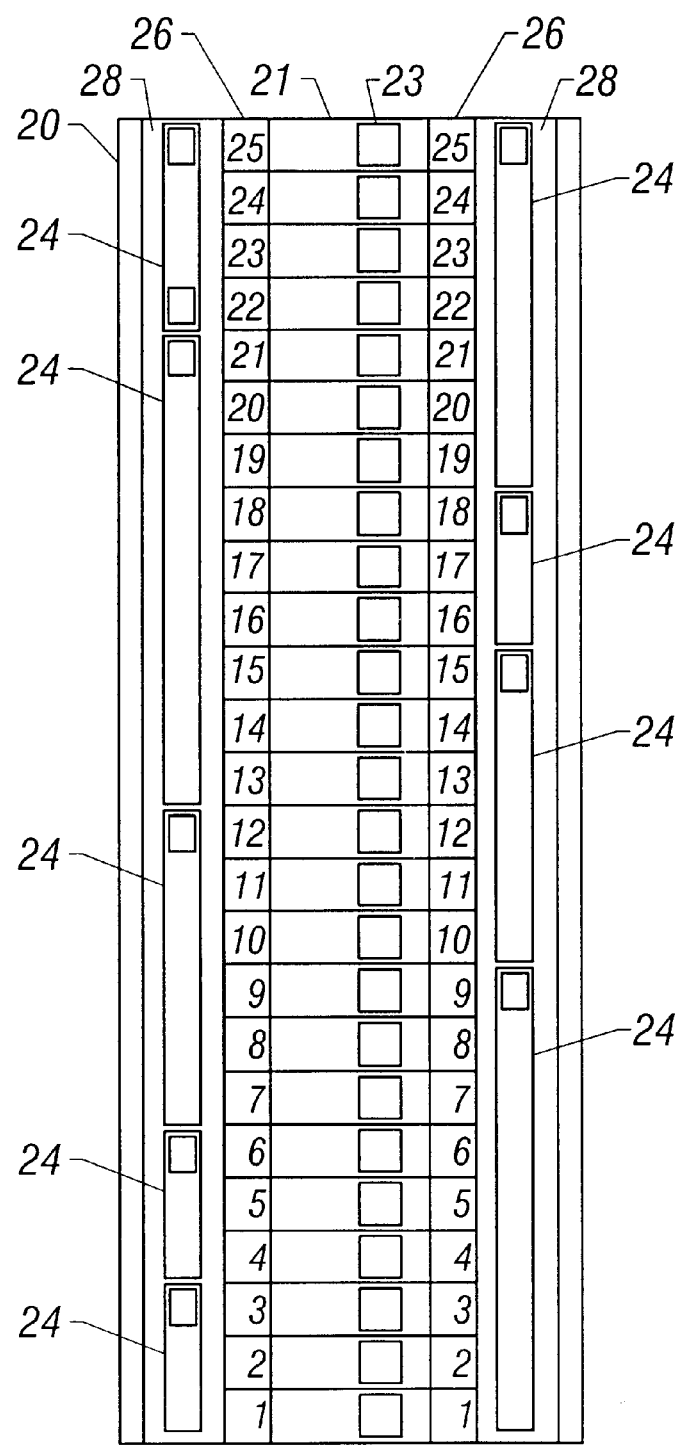
FIG. 5 shows a child training unit.

FIG. 5 shows a front view of a child teaching unit 20 that is about one half inch thick. The center unit 21 is a series of slots with each slot about one fourth inch deep and three fourths of an inch wide. We have chosen to show 25 slots but other numbers of slots could be equally useable. There are ⅜'s inch cubes 23 in the slots and each cube is finger slidable in each slot. The cubes are colored in groups of five. There is a flat stick holding slot on each side of center unit 21 with a flat stick therein numbered to form numbered stick 26 removably held on each side of the row of cubes with the numbers from 1 to 25 on the numbered stick 26 to provide a visual count of the cubes.

There is a Window stick holding slot 28 on each side of the numbered sticks 26. A window stick has a total length equal to the number of cubes listed on the stick but space for the upper cube is open both for ease of handling and to allow the user to read a number beneath. For example if window stick labeled 7 were laid with the bottom end on top the number 1 on the numbered stick the user would read the number 7 through the upper end of window stick 7. If all blocks were lined up as shown in the left position the user could use window stick 7 to shift seven blocks to the right position. Now if the user pushed 7 more blocks to the right he would read the number 14 on the number stick. He has just learned 7 plus 7 is 14. Now if the user laid window stick seven on top of the number stick with the window end of the end around 14 he could read 7 below the window stick and SEE that 14 minus 7 equals 7. He has learned that fourteen minus seven equals 7. This illustrates a simple use of the Number and window sticks.

There will be a minimum of ten different length properly labeled window type number sticks 24 for each Child teaching unit in the kit or held in the stick holder 28. Sides of stick holder slot 28 are formed by raised segments of the unit base.

The unit FIG. 5 can be used in upper elementary grades to explore and solve algebraic equations. For example the Instructor may show the equation X−7+4=Y and explain as the value of X changes then the value of Y changes. The Instructor may then say "Let's assume that the value of X equals ten." With the Number line stick 26 in place he can then use window stick 10 and push ten cubes to 'ten' and he can then use window stick 7 and slide over seven cubes to indicate minus 7 and he can then use window stick 4 and push back four cubes to indicate plus 4 and may count seven cubes left in line. In the equation he has modeled and physically shown that . . . If X=10 then Y=7. He can repeat and show that if X=12 then Y=9. He is SHOWING and MODELING. The students may then use their paper models or actual models to try different variations etc.,etc. He has shown how to "VISUALIZE THESE CONCEPTS IN A LINEAR FASHION."

What is claimed is:

1. A primary teaching kit comprising
   a) a container,
   b) a top for said container,
   c) a teaching tray and a number bridge attached to an underside of said top,
   d) angled slide in holders in said container to allow removing and sliding in said top in a front portion of said container to hold said teaching tray and said number bridge in an inclined position;
   e) a minimum of one number line stick removably held over a central portion of a mininmum of fifteen slots with the interior of each slot being one inch wide by three inches long and one half inch deep in said number bridge with said number bridge also having a one inch by one inch holding unit at each end of said number bridge to hold said number line stick,
   f) five red plus five blue plus five yellow cubes with each cube of said five red plus five blue plus five yellow cubes slidably held in said slots in said number bridge,
   g) a minimum of two angled number sticks with each labeled on an interior side with the number of inches in length of said angled number stick written both in words and numbers.

2. A primary training kit as in claim 1 further comprising a number sweeper unit with said five red plus five blue, plus five yellow cubes in place in said number bridge and one of said number line sticks in place, said number sweeper is so designed that a beginning end of said number sweeper may be manually placed over a beginning end of said number line stick and pulled downward to sweep all of said five red plus five blue plus five yellow cubes to be hidden under said number line stick.

3. A Child training unit comprising;
   a) a flat rectangular base,
   b) a cube holding unit linearly and centrally located in said base comprising a maximum of about twenty six slots sized to be about ⅜ inch apart, ¼ inch deep and ¾ inch wide;
   c) ⅜ inch cubes, each sized to slide smoothly in one of said slots;
   d) a minimum of two stick holding slots on each side of said cube holding unit, each of said stick holding slots being formed from a narrow raised segment of said base;
   e) a flat stick sized to slidably fit into one of said stick holding slots with numbers one to twenty six on said flat stick with each of said numbers being located to be beside one of said twenty six slots when said flat stick with said numbers thereon is located in one of said stick holding slots beside said cube holding unit;
   f) a minimum of ten window sticks, a window stick having a about a three eights square opening on one end to facilitate handling and reading a number through said opening, each of said window sticks being labeled with a number indicating a total number of cubes that said stick including said window therein could cover.

* * * * *